United States Patent
Wylie et al.

(10) Patent No.: US 10,046,989 B2
(45) Date of Patent: Aug. 14, 2018

(54) ELECTROCHEMICAL SYSTEM AND METHOD FOR ON-SITE GENERATION OF OXIDANTS AT HIGH CURRENT DENSITY

(71) Applicant: Advanced Diamond Technologies, Inc., Romeoville, IL (US)

(72) Inventors: Ian Wakefield Wylie, Surrey (CA); Prabhu U. Arumugam, Ruston, LA (US); Hongjun Zeng, Naperville, IL (US); John Arthur Carlisle, Plainfield, IL (US)

(73) Assignee: Advanced Diamond Technologies, Inc., Romeoville, IL (US)

( * ) Notice: Subject to any disclaimer, the term of this patent is extended or adjusted under 35 U.S.C. 154(b) by 20 days.

(21) Appl. No.: 14/694,586

(22) Filed: Apr. 23, 2015

(65) Prior Publication Data
US 2016/0280567 A1 Sep. 29, 2016

Related U.S. Application Data

(60) Division of application No. 14/054,741, filed on Oct. 15, 2013, now abandoned, which is a continuation of
(Continued)

(51) Int. Cl.
*C02F 1/46* (2006.01)
*C02F 1/467* (2006.01)
(Continued)

(52) U.S. Cl.
CPC ............ *C02F 1/4674* (2013.01); *C02F 1/008* (2013.01); *C02F 1/4672* (2013.01); *C25B 1/13* (2013.01);
(Continued)

(58) Field of Classification Search
None
See application file for complete search history.

(56) References Cited

U.S. PATENT DOCUMENTS

| | | | |
|---|---|---|---|
| 3,616,355 | A | 10/1971 | Themy et al. |
| 4,255,246 | A | 3/1981 | Davis et al. |

(Continued)

FOREIGN PATENT DOCUMENTS

WO WO 02/17975 A1 3/2002

OTHER PUBLICATIONS

PCT Notification of Transmittal of the International Search Report and the Written Opinion of the International Searching Authority, or the Declaration with accompanying PCT International Search Report and PCT Written Opinion of the International Searching Authority dated Jan. 8, 2018.

(Continued)

*Primary Examiner* — Arun S Phasge
(74) *Attorney, Agent, or Firm* — Locke Lord LLP; Peter J. Fallon

(57) ABSTRACT

An electrochemical system and method are disclosed for On Site Generation (OSG) of oxidants, such as free available chlorine, mixed oxidants and persulfate. Operation at high current density, using at least a diamond anode, provides for higher current efficiency, extended lifetime operation, and improved cost efficiency. High current density operation, in either a single pass or recycle mode, provides for rapid generation of oxidants, with high current efficiency, which potentially allows for more compact systems. Beneficially, operation in reverse polarity for a short cleaning cycle manages scaling, provides for improved efficiency and electrode lifetime and allows for use of impure feedstocks without requiring water softeners. Systems have application for generation of chlorine or other oxidants, including mixed (Continued)

oxidants providing high disinfection rate per unit of oxidant, e.g. for water treatment to remove microorganisms or for degradation of organics in industrial waste water.

23 Claims, 9 Drawing Sheets

Related U.S. Application Data application No. PCT/US2012/033557, filed on Apr. 13, 2012.

(60) Provisional application No. 61/475,978, filed on Apr. 15, 2011.

(51) Int. Cl.

| | |
|---|---|
| C25B 1/13 | (2006.01) |
| C25B 1/26 | (2006.01) |
| C25B 1/30 | (2006.01) |
| C25B 11/12 | (2006.01) |
| C25B 15/02 | (2006.01) |
| C25B 15/08 | (2006.01) |
| C02F 1/00 | (2006.01) |
| C25B 1/28 | (2006.01) |
| C25B 11/03 | (2006.01) |
| C25B 11/04 | (2006.01) |
| C02F 1/461 | (2006.01) |
| C02F 103/08 | (2006.01) |
| C02F 101/30 | (2006.01) |
| C02F 103/34 | (2006.01) |

(52) U.S. Cl.
CPC ............... *C25B 1/26* (2013.01); *C25B 1/285* (2013.01); *C25B 1/30* (2013.01); *C25B 11/035* (2013.01); *C25B 11/04* (2013.01); *C25B 11/12* (2013.01); *C25B 15/02* (2013.01); *C25B 15/08* (2013.01); *C02F 2001/46119* (2013.01); *C02F 2001/46147* (2013.01); *C02F 2001/46157* (2013.01); *C02F 2101/30* (2013.01); *C02F 2103/08* (2013.01); *C02F 2103/34* (2013.01); *C02F 2201/4611* (2013.01); *C02F 2201/4613* (2013.01); *C02F 2201/4614* (2013.01); *C02F 2201/4618* (2013.01); *C02F 2201/46145* (2013.01); *C02F 2201/46185* (2013.01); *C02F 2209/02* (2013.01); *C02F 2209/40* (2013.01); *C02F 2303/04* (2013.01); *Y02W 10/37* (2015.05)

(56) References Cited

U.S. PATENT DOCUMENTS

| | | | |
|---|---|---|---|
| 4,767,511 | A | 8/1988 | Aragon |
| 4,978,438 | A | 12/1990 | Shimamune et al. |
| 5,900,127 | A | 5/1999 | Iida et al. |
| 6,319,390 | B1 | 11/2001 | Kono et al. |
| 6,855,242 | B1 | 2/2005 | Comninellis et al. |
| 6,855,242 | C1 | 1/2010 | Comninellis et al. |
| 7,704,353 | B2 | 4/2010 | Stadelmann et al. |
| 7,887,679 | B2 | 2/2011 | Kitaori et al. |
| 7,951,274 | B2 | 5/2011 | Yoshida et al. |
| 8,277,623 | B2 | 10/2012 | Kato et al. |
| 8,323,461 | B2 | 12/2012 | Scarsbrook |
| 8,361,289 | B2 | 1/2013 | Whitehead et al. |
| 8,431,006 | B2 | 4/2013 | Arihara et al. |
| 8,591,856 | B2 | 11/2013 | Doering et al. |
| 8,734,626 | B2 | 5/2014 | Arihara et al. |
| 8,815,064 | B2 | 8/2014 | Kato et al. |
| 8,980,079 | B2 | 3/2015 | Yost, III et al. |
| 9,380,920 | B2 | 7/2016 | Pollack |
| 2002/0130091 | A1 | 9/2002 | Ekberg et al. |
| 2005/0139487 | A1 | 6/2005 | Zwicker et al. |
| 2007/0023273 | A1* | 2/2007 | Kitaori .................. A61L 2/183 204/164 |
| 2008/0251108 | A1 | 10/2008 | Nagai et al. |
| 2009/0211918 | A1 | 8/2009 | Hardee |
| 2010/0006450 | A1 | 1/2010 | Whitehead et al. |
| 2010/0135869 | A1 | 6/2010 | Shiue et al. |
| 2010/0170783 | A1 | 7/2010 | Wesner et al. |
| 2012/0205255 | A1 | 8/2012 | Roster et al. |
| 2013/0032491 | A1 | 2/2013 | Nitta et al. |
| 2013/0206604 | A1 | 8/2013 | Lutz et al. |
| 2013/0206654 | A1 | 8/2013 | Lutz et al. |
| 2013/0240458 | A1 | 9/2013 | Conradt et al. |
| 2013/0341204 | A1 | 12/2013 | Sung |
| 2014/0174942 | A1 | 1/2014 | Wylie et al. |
| 2014/0054166 | A1 | 2/2014 | Brandon et al. |
| 2014/0076726 | A1 | 3/2014 | Cheng et al. |
| 2015/0129419 | A1 | 5/2015 | Sekiguchi et al. |
| 2015/0167183 | A1 | 6/2015 | Müller et al. |
| 2015/0376804 | A1 | 12/2015 | Gorokhovsky et al. |
| 2016/0101997 | A1 | 4/2016 | Hamaguchi et al. |

OTHER PUBLICATIONS

Marshall Stoneham, "Forward," pp. ix-x (Jun. 2000).
D.M. Gruen, "Applications of ultrananocrystalline diamond films," pp. 313-317 (Jan. 2000).
M.H. Nazaré et al., Properties, Growth and Applications of Diamond, pp. xi-xx (Dec. 8, 2000).
S. Ferro et al., "Chlorine Evolution at Highly Boron-Doped Diamond Electrodes," Journal of The Electrochemical Society, 147:7, pp. 2614-2619 (2000).

* cited by examiner

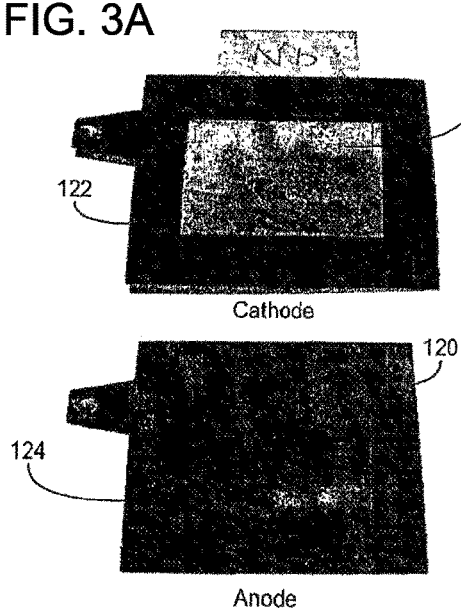
FIG. 3A
Cathode
FIG. 3B
Anode
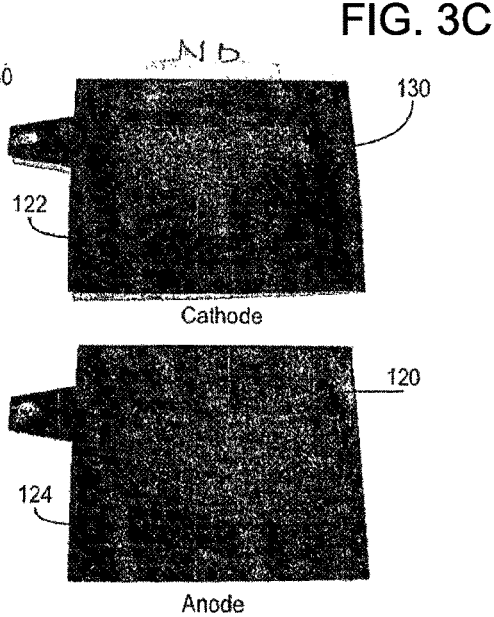
FIG. 3C
Cathode
FIG. 3D
Anode

ELECTROCHEMICAL SYSTEM AND METHOD FOR ON-SITE GENERATION OF OXIDANTS AT HIGH CURRENT DENSITY

CROSS-REFERENCE TO RELATED APPLICATION

This application is a divisional of U.S. patent application Ser. No. 14/054,741 filed on Oct. 15, 2013 which is a continuation of PCT international application Ser. No. PCT/US2012/033557, filed Apr. 13, 2012, which claims priority to U.S. Provisional Patent Application Ser. No. 61/475,978 entitled "Method for the operation of an electrochemical on-site generation system at high current density", filed Apr. 15, 2011 by the present inventors. The entire disclosure of the aforementioned patent applications are incorporated herein by this reference.

TECHNICAL FIELD

This invention relates to systems and methods for electrochemical On-Site Generation (OSG) of oxidants, and more particularly relates to systems and methods using diamond electrodes for improved efficiency or extended lifetime operation.

BACKGROUND ART

Oxidants such as hypochlorite, comprising Free Available Chlorine (FAC), are widely used, for example, for water treatment. Conveniently, these oxidants may be generated electrochemically, e.g. from aqueous feedstock electrolytes containing sodium chloride, i.e. common salt, or other salts, using On-Site Generation (OSG) systems. Oxidants, which may comprise various other species of oxidant, such as one or more of peroxodisulfate (peroxydisulfate or persulfate), hydrogen peroxide, chlorine dioxide or ozone, for example, have also been generated using such systems. Mixed oxidants, formed from chloride containing feedstocks, have been demonstrated to have advantages over chlorine or hypochlorite alone, when treating some waterborne microorganisms that are chlorine resistant, or for treating biofilms, which tend to be negatively charged and more resistant to hypochlorite ion (FAC) disinfection.

A problem with known OSG systems for generating oxidants and mixed oxidants is premature oxidation and/or degradation of the electrodes and other system components. This places significant limitations on the selection of electrode materials and on the long term reliability and performance of OSG systems used for generating oxidants. It is well known that OSG systems for generation of oxidants, including hypochlorite, are preferably operated at relatively low current density (typically significantly lower than 150 $mA/cm^2$, e.g. 30-80 $mA/cm^2$) and under constant polarity, to prevent or reduce premature failure of the anodes due to oxidation of the surface layers or underlying substrates.

Known prior art systems for chlorine and mixed oxidant generation typically utilize Dimensionally Stable Anodes (DSA) and stainless steel or titanium cathodes. DSA electrodes are available at reasonable cost and provide an operational lifetime of about a year when operated at low current density (i.e. typically 30 to 80 $mA/cm^2$). Operation at higher current densities to increase the daily output of oxidant is difficult without significantly or unacceptably reducing the operational lifetime of the DSA anode.

Another particular issue for OSG systems for chlorine generation from salt is the build-up of scale, e.g. from calcium and magnesium impurities found in feedstocks, such as impure salts, and also in freshwater and seawater, particularly at higher operating temperatures. Seawater, which has a salt concentration of about 0.6 Molar, potentially offers an attractive low cost feedstock for a single pass system, i.e. where an effectively unlimited supply may be continuously pumped through the OSG system. However, impurities in low cost feedstocks, such as solar salt or seawater, tend to cause unacceptable levels of scaling or fouling of the electrodes (in particular the cathode) and other system components.

As described for example, in U.S. Pat. No. 4,578,160 to Asano et al., issued Mar. 25, 1986, entitled "Method for electrolyzing dilute caustic alkali aqueous solution by periodically reversing electrode polarities," in a system using electrodes of iron, nickel, or their alloys, such as stainless steel, periodic reversal of the polarity of the anode and cathode diminishes oxidation of the anode and reduces scaling and deposits of impurities. Thus, this mode of operation increases the time between maintenance cycles, and reduces the operating voltage of the cell, which lowers the amount of electrical energy (i.e. power) required for operating the cell.

On the other hand, for OSG generation of oxidants, the DSA electrodes conventionally used for OSG of chlorine and other oxidants are preferably not operated under reverse polarity to avoid causing premature degradation of the electrode material. This is because DSA electrodes comprise conductive oxides, such as oxides of ruthenium or iridium. Thus, under reverse polarity the oxides tend to breakdown causing the electrode to disintegrate prematurely, which severely shortens the electrode lifetime and reliability. Conversely, stainless steel cathodes are susceptible to oxidation (rusting) if operated in reverse polarity. Thus, in DSA electrode systems, other methods must be used to remove scale, such as flushing or cleaning the system with concentrated hydrochloric acid, so as to avoid a costly and time consuming process of disassembly and cleaning the system. To avoid handling of concentrated acids, it is preferable to take measures to prevent scaling.

To avoid or reduce scaling, OSG systems using DSA electrodes cannot be operated with impure salt, i.e. feedstocks with more than 0.1% calcium and magnesium. In practical terms, this also excludes use of impure, low cost salt feedstocks, or use of hard water or seawater with impurities that cause scaling or fouling of the system. Purification or filtration of the feedstock is required and/or water softeners are usually required. These add very significantly to the capital costs and operating costs of such systems.

Another disadvantage of DSA electrodes is that the electrode lifetime has strong thermal dependence, and their lifetime is significantly reduced when used beyond an optimal temperature range.

It is known to use diamond as an electrode material for electrolysis of sodium chloride or other chloride containing feedstocks. In U.S. Pat. No. 6,767,447 to Uno et al., (Permelec) issued Jul. 27, 2004, entitled "Electrolytic cell for hydrogen peroxide production and process for producing hydrogen peroxide," it is proposed that diamond based electrode surfaces have an increased electrode life and also provide enhanced electrochemical performance for certain applications, e.g. those requiring a higher rate of hydroxyl radical (OH radical) formation, from dilute alkali solutions. However, it is disclosed that chloride salt concentrations are maintained below 0.1M, to avoid significant production of chlorine.

The use of diamond anodes is also reported, for example, in United States Patent Publication No. 2007/0 170070 to Uno et al. (Permelec), dated Jul. 26, 2007, entitled "Electrolysis cell for synthesizing perchloric acid compound and method for electrolytically synthesizing perchloric acid compound" and references cited therein. This application discloses use of diamond electrodes to improve current efficiency using feedstocks comprising higher concentrations (0.1M or more) of chloride or chloric acid, but nevertheless it achieves very low current efficiencies, i.e. at most 20%.

On the other hand, diamond electrodes are significantly more expensive to manufacture (i.e. by a factor of ~10-100 times) than conventional DSA anodes and stainless steel cathodes of similar active surface area. On that basis alone, there is little incentive or motivation for operators to replace conventional systems based on the incumbent technology using DSA electrodes with systems using more expensive diamond electrodes, when regular maintenance and operation at low current density can provide an operational lifetime of about a year or sometimes even more for DSA electrodes when operated at low current densities (e.g. <100 mA/cm$^2$).

However, yet another issue is the output capacity of available OSG systems, i.e. the required daily output of chlorine, which may be several pounds of chlorine or mixed oxidant per day. To provide sufficient daily output of oxidant, the system must be relatively large, e.g. it may typically be a table sized unit, having a volume of several cubic feet. It requires multiple cells or many pairs of electrodes operating at only 30 mA/cm$^2$ to provide sufficient active area to provide the desired daily output of oxidant under conventional operating conditions. Operation at low current density limits the rate of production of oxidant, and a FAC concentration of 6000 to 8000 ppm may require extended hours of operation. As mentioned above, while seawater is a potential cheap feedstock, in addition to issues of scaling from impurities, these systems have limited capacity to rapidly produce a high enough concentration of FAC or other oxidants from seawater. Electrolyte feedstocks with higher salt concentrations are required, and must use expensive purified salt or rely on water softeners to avoid scaling and fouling of the system.

As mentioned above, mixed oxidants that comprise FAC together with other oxidants such as hydroxyl, hydrogen peroxide, et al. have been demonstrated to be more effective in treating chlorine resistant microorganisms (Water Conditioning and Purification, "On-Site Mixed Oxidants Generate Benefits in Puerto Rico", Carlos Gonzalez, September 2002, p. 62-65). Thus it is desirable to develop processes that enhance production of mixed oxidants comprising hypochlorite and/or other oxidant species that are more effective in destroying such microorganisms.

In summary, a need exists to increase the cost efficiency and reliability of systems and methods for OSG production of oxidants and to increase the rate of production of oxidants. It would also be desirable to provide more compact systems and/or lower maintenance systems, which can produce a daily output of several pounds of chlorine or other oxidants, including mixed oxidants, to enable more flexible deployment, in a wider range of applications.

Thus, there is a need for improved or alternative solutions which address one or more of these shortcomings of known systems and methods for OSG of oxidants and mixed oxidants.

SUMMARY OF INVENTION

The present invention seeks to provide improved systems and methods for OSG of oxidants, which overcome at least some of the above mentioned problems, or provide an alternative.

Thus, aspects of the present invention provide a system and methods for On-Site Generation (OSG) of chemical species comprising oxidants and more particularly relates to generation of FAC and mixed oxidants from aqueous solutions of sodium chloride (common salt), solar salt or other salts, such as sodium sulfate, or mixtures thereof.

One aspect of the invention provides a system for On-Site Generation (OSG) of oxidants comprising: an electrochemical cell comprising an anode and a cathode defining an active area of the cell, at least the anode being a conductive diamond anode; flow control means for injecting the aqueous electrolyte between the electrodes; and current means for supplying current for electrolyzing the aqueous feedstock electrolyte at a current density in the range from 150 mA/cm$^2$ to 1000 mA/cm$^2$.

Another aspect of the invention provides a method for On-Site Generation (OSG) of oxidant, such as hypochlorite, and other forms of FAC or mixed oxidants, or persulfate, in an electrochemical cell comprising a conductive diamond anode and a cathode, preferably comprising one of conductive diamond, tungsten, graphite, stainless steel, zirconium or titanium, wherein the anode and cathode define an active area of the cell, comprising: supplying an aqueous feedstock electrolyte; and in an operational cycle, electrolyzing the aqueous feedstock electrolyte at a current density in the range from 150 mA/cm$^2$ to 1000 mA/cm$^2$.

Advantageously, the method comprises electrolyzing the aqueous feedstock electrolyte at a current density above 200 mA/cm$^2$, and more preferably at a current density in the range from 300 mA/cm$^2$ to 600 mA/cm$_2$ [0023] Beneficially, the method comprises controlling the temperature and flow rate of the electrolyte, and other operational parameters, and selecting the current density for electrolyzing the feedstock to provide a current efficiency that is at least 10% higher, and preferably 20% higher than the current efficiency at 150 mA/cm$^2$.

In preferred embodiments, the system and method provide for generation of oxidants comprising chlorine, hypochlorite, other forms of free active chlorine (FAC), mixed oxidants, or persulfate, for example, from an aqueous feedstock electrolyte comprising, for example, one or more of sodium chloride, sodium sulfate, other alkali metal chloride, other alkali metal sulfate or alkaline earth metal sulfate or sulfuric acid.

As described herein, it has been discovered that, in systems comprising at least a diamond anode, operation at high current density provides a higher rate of production of FAC, and additionally provides improved current efficiency and reduced energy requirements per unit of oxidant, resulting in improved cost efficiency. In preferred embodiments, operation at high current density also results in an oxidant that is believed to be a mixed oxidant because it provides increased disinfection capability per unit of oxidant relative to standard bleach or hypochlorite solutions of comparable FAC concentrations. Operation at high current density thus enables use of smaller, and therefore less expensive, cell sizes to obtain a required daily output of oxidant and reduced operating costs per pound of oxidant.

The use of a "recycle mode" or batch mode to gradually increase the concentration of the desired end-product (oxidant) has been shown to offer advantages, such as more complete salt conversion at higher concentrations. This is beneficial because higher salt concentrations are preferred for higher current density.

Methods according to preferred embodiments can be used for the generation of chlorine, e.g. hypochlorite or other FAC species, or other electrochemically-produced oxidants, such as peroxodisulfate ("persulfate"), and for generation of mixed oxidants which may additionally comprise one or more of chlorite, chlorine dioxide, ozone and hydrogen peroxide, for example.

Additionally, it has been discovered that periodically reversing the polarity on the cell for as little as a few minutes per operational cycle, e.g. daily or monthly, at high current density, can be used to clean the cathode from the build-up of scale deposits from the use of low quality salts, i.e., those containing 0.1% or more by weight of calcium and magnesium-containing "hard water" compounds.

Methods according to preferred embodiments carried out in systems comprising diamond electrodes, and particularly UNCD electrodes, which comprise a periodic reverse polarity cleaning cycle, have been shown to be efficient in the preparation of high concentrations of electrochemically produced reactants using inexpensive, impure feedstocks, without requiring expensive membranes, or water softeners.

In summary, systems and methods are provided for on site generation of oxidants, such as FAC, mixed oxidants and persulfate, using diamond electrodes that can operate reliably for extended periods at high current density. Systems may provide for high current density operation in either a recycle/batch mode where a volume of electrolyte feedstock is recirculated to increase the FAC concentration in successive cycles, or alternatively a single-pass or continuous flow mode, using fresh electrolyte feedstock, which may be seawater, for example.

The system advantageously operates at high current density with high current efficiency and high cost efficiency. Preferred embodiments provide long life, high output, high efficiency OSG systems which are low maintenance and "self-cleaning" that can be used for generation of chlorine and other oxidants, including mixed oxidants, from low cost impure feedstocks, such as aqueous solar salt or seawater or oxidants such as persulfate from other salts such as sodium sulfate.

Thus, electrochemical systems and methods for OSG of oxidants and other reactive species are provided, which mitigate one or more of the problems mentioned above.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

In the drawings, identical or corresponding elements in the different Figures have the same reference numeral.

FIGS. 3A to 3D shows photographs of the diamond electrodes before and after a reverse polarity cleaning cycle: FIG. 3A and FIG. 3B show the cathode and anode respectively after 24 hours of operation at 300 mA/cm$^2$ with 2M Solar Salt, and FIG. 3C and FIG. 3D show the same electrodes after a 3 minute reverse polarity cleaning cycle;

Figure 1:
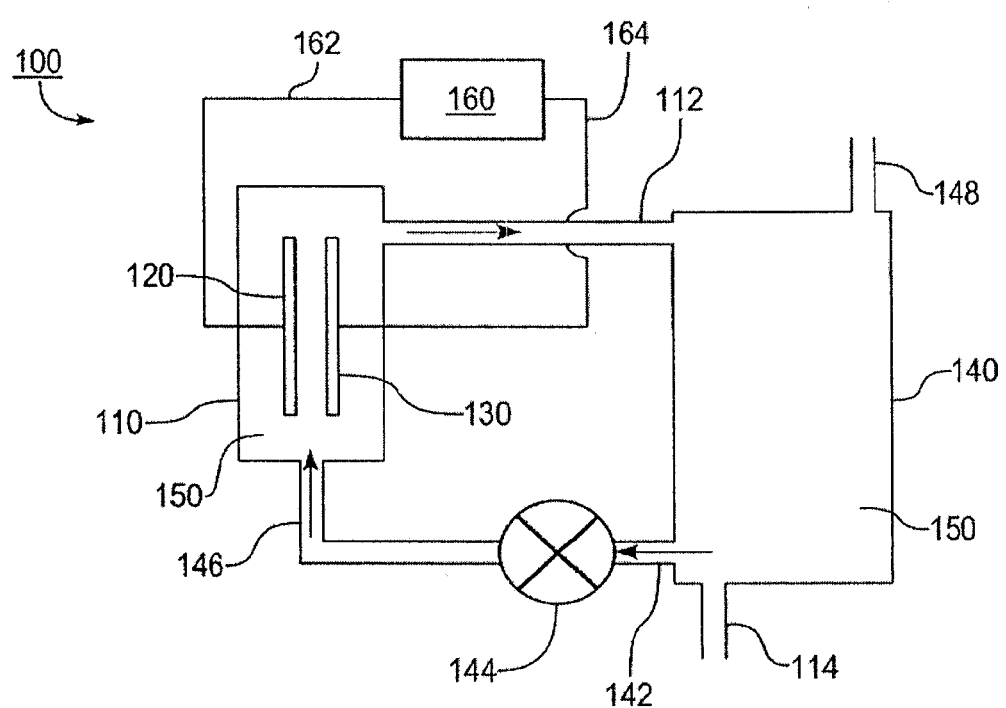
FIG. 1 illustrates schematically an OSG system according to a first embodiment of the present invention for operation in a recycle mode.

FIG. 6 is a chart showing the effect of current density on OSG current efficiency for a cell with UNCD diamond electrodes having an active area of 210 cm$^2$ operated in recycle (batch) mode;

FIG. 7 is a chart showing free available chlorine (FAC) concentration vs. time for operation at 150 mA/cm$^2$ and at 600 mA/cm$^2$ using UNCD diamond cathode and anode;

FIG. 8 is a chart showing FAC vs. time for feedstocks comprising three different solar salt concentrations (0.6M, 1M and 2M) for operation at a current density of 300 mA/cm$^2$; and FIG. 9 is chart showing further data relating to Colony Forming Units (CFU) numbers vs. exposure time to demonstrate inactivation of *Bacillus globigii* spores by a solution comprising oxidant generated in electrolyzing sodium chloride at high current density in a diamond electrode OSG system according to a method of a preferred embodiment relative to standard bleach solution.

DETAILED DESCRIPTION OF PREFERRED EMBODIMENTS

An electrochemical system 100 for on-site generation of oxidants comprising FAC according to a first embodiment of the present invention is shown in FIG. 1. The system comprises a reaction tank or electrolysis cell 110 containing electrodes 120 and 130 together with a feedstock reservoir 140, containing sodium chloride electrolyte solution 150, which, for example, comprises an aqueous solution of an impure feedstock, such as solar salt. The electrode pair 120/130 comprises at least a diamond anode and preferably comprises a matched diamond anode 120 and diamond cathode 130 as will be described below. In this embodiment, the system is configured for operation in a recycle mode, or batch mode. The electrolyte feedstock 150 held in the reservoir 140 is injected into the tank 110 between electrodes 120 and 130, via pump 144 and conduit 146 at the bottom of the cell 110. The feedstock electrolyte 150 is injected, by the pump 144, for example, at a rate from about 0.2 liters/minute (very low flow) to about 9 liters/minute (high flow), and preferably about 1 to 5 liters/minute, for each 200 cm$^2$ of active area of the cell. Feedstock electrolyte 150 exits the reaction tank 110 via conduit 112 and is returned to the reservoir 140 after processing. The reservoir 140 also includes ports 114 and 148 respectively at the bottom and top of the chamber respectively, e.g. for addition of feedstock, or output of the processed electrolyte solution, e.g. after a particular processing time, when the oxidant concentration has reached a desired level.

Controller 160 comprises a low voltage, high current power supply for supplying an elevated DC current density relative to systems using conventional DSA electrodes, i.e.

greater than 150 mA/cm² and up to 1000 mA/cm² of active area, with an operating voltage, typically, of <7 V. That is, for a cell having an active area of 100 cm² to 200 cm² the required current would be in the range from about 15 A to 200 A.

By way of example only, the electrolyte volume of the system is, for example, from 500 mL to 30 L, and the size of cell 110 is approximately 12" high by 6" wide (30 cm×15 cm), and the electrodes 120 and 130 have an active area of 100-200 cm² and an electrode separation of 4-8 mm.

In exemplary systems and methods used to obtain data shown in the accompanying figures, the diamond electrodes have an active area of either 100 cm² (e.g. Julius) or 10 cm² Nero (R+D test systems) or 210 cm² (e.g. Diamonox 200, 6 L or 12 L batch/recycle mode system) and the electrode separation is set at 4 mm, 8 mm, or 15 mm, for example.

The system may optionally comprise a cooling system, e.g. using water cooling (not shown) to maintain the electrolyte at a desired operating temperature, i.e. below 86 degrees Fahrenheit (~30 degrees Celsius) and preferably below 68 degrees Fahrenheit (~20 degrees Celsius).

This is beneficial because, at high current densities, the temperature of the cell tends to increase from the large amount of power applied to the cell, and impurities that cause scaling, such as calcium and magnesium salts, tend to be more soluble at low water temperatures.

Under normal operating conditions (DC, forward voltage) one electrode, e.g. electrode 120, operates as the anode in the electrochemical process and the other electrode 130 as a cathode. At least the anode comprises a conductive diamond electrode, and is preferably a microcrystalline diamond or ultrananocrystalline diamond (UNCD) anode. The other electrode, i.e. the cathode, may be a low cost stainless steel electrode, for example. Alternatively, the cathode can be a matched diamond electrode. Conductive diamond is chemically and electrochemically inert and, in particular, has enhanced adhesion to metal substrates such as niobium and tantalum. Since diamond electrodes typically fail by delamination of the diamond layer, an electrode comprising UNCD on a metal substrate such as niobium or tantalum can provide reliable operation over an extended lifetime.

High Current Efficiency Operation at High Current Density

The experiments described herein demonstrate that use of at least a conductive diamond anode, and optionally also a similar diamond cathode, enables reliable operation of the OSG system for generating oxidants comprising FAC from salt solutions at high current densities in a range from 150-1000 mA/cm² above the standard operating range for DSA anodes. Beneficially, the process is carried out at current densities above 200 mA/cm². In particular, operation at current densities in the range from 300-600 mA/cm² is demonstrated to provide improved current efficiency with excellent electrode lifetime with reasonable trade-offs between energy costs and capital costs of the diamond per pound of oxidant produced. It is observed that the UNCD electrodes are able to withstand high current density for extended periods, especially with the use of higher salt concentration feedstocks (e.g. 1 M-3M), and they potentially allow for an operational lifetime of greater than 2 years, and potentially 5 years at current densities >300 mA/cm². As is conventional in this art, the operational lifetime of the electrode is defined by the point at which the operating voltage increases exponentially and irreversibly, typically by more than 3V, indicating degradation or breakdown of the electrode. By way of comparison, a conventional DSA electrode would be expected to last only 1 year or less at 150 mA/cm², under an optimal temperature range.

Figure 4:
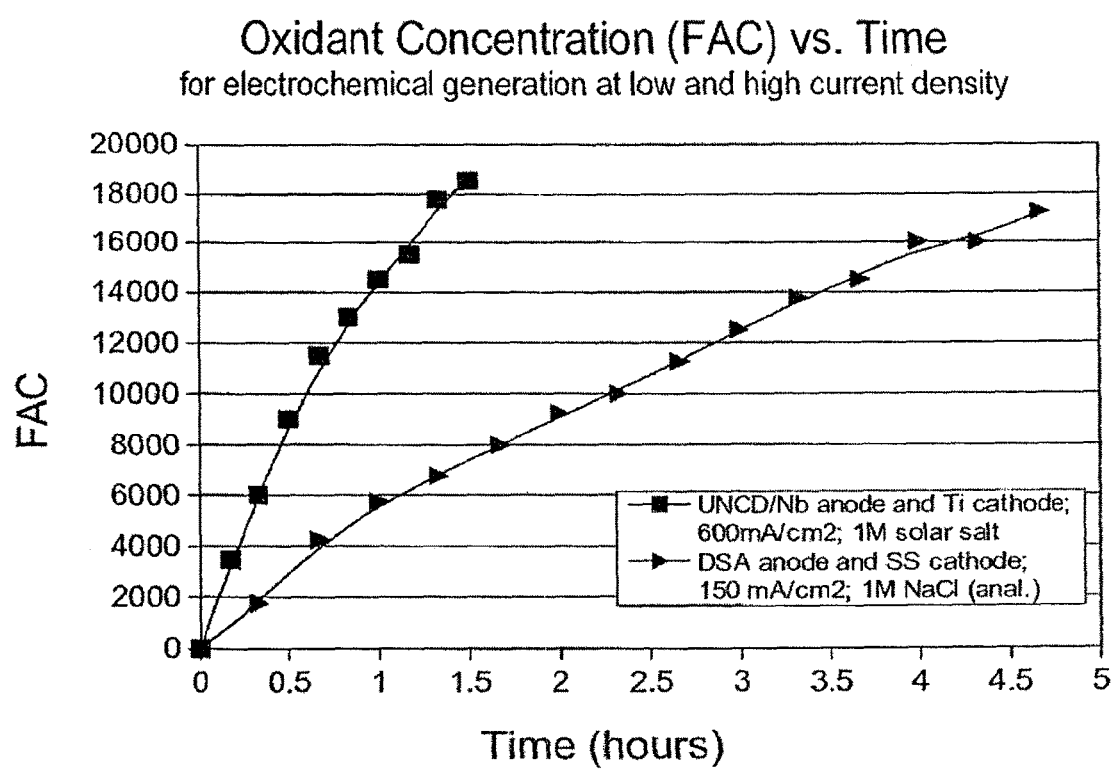
FIG. 4 is a chart comparing the FAC concentration in ppm as a function of time for electrolyzing a feedstock comprising 1M salt (anal.) using a DSA anode and SS cathode at a current density of 150 mA/cm$^2$ and a feedstock comprising 1M Solar Salt using a diamond anode and a titanium cathode at a current density of at 600 mA/cm$^2$.

Operation at high current density provides an increased rate of production of the oxidant, as illustrated in FIG. 4, for example. FIG. 4 compares the rate of production of FAC in ppm for operation of a test system at low current density (150 mA/cm²), using a conventional DSA anode and stainless steel (SS) cathode and using a feedstock comprising 1M analytical grade (Sigma Aldrich) sodium chloride solution (electrode gap of 8 mm, 100 cm² active area, and an approximate cell voltage of 6V), and the same system operating at high current density (600 mA/cm²) using a UNCD/Nb anode and a Ti cathode (electrode gap of 8 mm, 100 cm² active area and an approximate cell voltage of 6V), using a feedstock comprising 1M solar salt (impure salt) solution. In each case the system was operated in a batch mode/recycle mode using a 500 mL volume of electrolyte solution and electrodes having a 100 cm² active area. The flow rate was approximately 400 mL/min and the electrolyte solution was maintained at a temperature of approximately 30 degrees Celsius (cooling water used to maintain this low temperature).

As shown in FIG. 4, in operation of a system at low current density using a DSA anode, it is observed that FAC concentration tends to plateau before conversion of 50% or less of the chloride content of the feedstock. The cell operating at high current density, i.e. 600 mA/cm², using diamond electrodes was able to rapidly provide significantly higher conversion rates which rapidly produced FAC concentrations over 10,000 ppm, with less apparent saturation effects. Comparative results for operation of the DSA electrode at high current density under the same conditions were impractical because the DSA electrodes fail very rapidly at 600 mA/cm². It was observed that the power requirement is dependent on temperature, salt concentration (more concentrated solutions have higher conductivity) and electrode gap (electrolyte resistance).

While the anode 120 comprises a conductive diamond electrode, preferably UNCD on a suitable metal substrate, e.g. niobium (Nb) or tantalum (Ta), to provide extended lifetime at high current density, the cathode 130 may comprise more traditional known electrode materials such as stainless steel, tungsten, high quality graphite, zirconium (Zr), titanium (Ti), or other suitable metals. For example the cathode may comprise an inexpensive stainless steel electrode. However, it is beneficial to use a conductive diamond cathode 130, and preferably a matched UNCD on metal electrode, to similarly extend the life of both electrodes and enable reliable operation of the cell with extended periods between maintenance.

Another advantage of using diamond electrodes is that they may be operated under reverse polarity for reasonable periods of time (up to several hours) without deleterious effects. Thus, advantageously the system also provides for periodic reverse polarity operation for a short time, e.g. several minutes to as little as fifteen seconds, to provide a cleaning cycle, as will be described in detail below. A reverse polarity cleaning cycle further contributes to improved long-term reliability and reduced maintenance.

The pump preferably allows for adjustment of the flow rate for control of the reaction rates and/or rate of production of the oxidant. At elevated current densities, the reaction process may not require additional mixing, since the hydrogen (H2) production on the cathode is sufficiently energetic to produce adequate mixing for continuing reaction. Beneficially, the electrode spacing and the flow rate is set to maintain flow between the electrodes, in the direction in which the hydrogen bubbles tend to move against gravity. Thus, as illustrated in FIG. 1, the feedstock is injected at the bottom, flows upward between the electrodes and exits at the top of the cell 110. The closed loop configuration shown in FIG. 1 allows for recirculation of a batch of electrolyte solution to enable operation in a recycle mode or batch mode.

Figure 2:
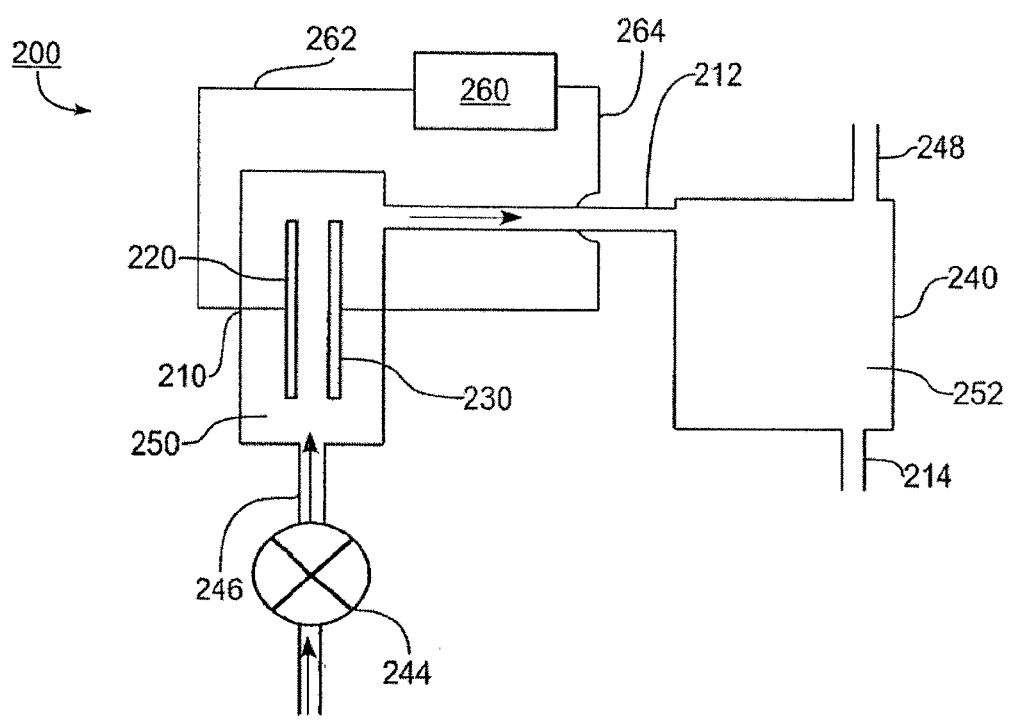
FIG. 2 illustrates schematically an OSG system according to a second embodiment of the present invention for operation in a single pass mode.

A system according to an alternative embodiment, configured for single pass or continuous flow operation, is shown in FIG. 2. In this embodiment, the cell 210 comprises anode 220 and cathode 230 with connections to a controller 260 comprising a power supply for supplying operating current and voltage, as in the first embodiment. In this configuration, feedstock electrolyte solution 250 is supplied to the cell 210 at a controlled flow rate via the pump 244 to an input port of the cell 246. After electrolysis, the processed electrolyte solution containing oxidant 252 exits the top of the cell via conduit 212 and is delivered to the reservoir 240, with ports 214 and 248 for output or connection as required.

While a pump (144 or 244) is illustrated, it will be appreciated that alternative flow control means may be used, such as a gravity feed system or other fluid delivery system that can supply the feedstock electrolyte solution to the cell at an appropriate flow rate.

Reverse Polarity/Cleaning Cycle

The polarity of the electrodes 120, 130 may be reversed for short periods of time to help remove mineral buildup (sometimes called "scale" or limestone deposits) and to "reactivate" the electrodes or form a fresh surface. This increases the life and performance of the electrodes and typically lowers the voltage required for a given current density and rate of reaction.

For operation in reverse polarity, the control system preferably provides for periodic reversal of the polarity of the power supply, which may be a switching system or simply a convenient quick-connect system to allow the operator to provide at least 15 seconds every day or week, depending on temperature and salt concentration, and impurity level of the salt (particularly the Ca and Mg content). Such reverse polarity operation may be done, for example, during regular maintenance checks. A reverse polarity/cleaning cycle using as little as 15 seconds to a few minutes of reverse polarity operation per month can be effective. The reverse polarity current and voltage applied may be similar to those used for forward polarity operation. Optionally, the reverse polarity operating conditions can be lower in current density and voltage than the "forward" operating conditions. In the operation of the OSG system using a pair of UNCD electrodes, the use of a periodic reverse polarity cleaning cycle for between 1 and 3 minutes (or even less time) was shown to reduce scaling sufficiently to allow the use of inexpensive solar salt, while avoiding the need for the use of an expensive water softener or expensive purified feedstock.

Low Cost Feedstocks

Solar salt is heavily contaminated with limestone forming "hard water" calcium and magnesium ions, and other impurities such as silicates. The impurity level of calcium and magnesium in the solar salt used in the experiments described in this application was approximately 0.1-0.5% by weight.

The effectiveness of the reverse polarity operation is demonstrated, for example, by the photographs in FIG. 3A to 3D, which show an electrode pair comprising a diamond on niobium cathode 130 and a diamond on tantalum anode 120. The diamond active area of each electrode 120 and 130 is shown surrounded by a region 122, 124 that, in use, is covered by a gasket. FIGS. 3A and 3B respectively show the cathode and anode after extended operation when build-up of scale (e.g. limestone or calcium carbonate deposits), particularly on the cathode in FIG. 3A, is apparent. FIGS. 3C and 3D show the same electrodes 120 and 130 after a 3 minute reverse polarity cleaning cycle. When the reverse polarity cleaning cycle is applied to a cell under operation at a current density of 300-600 $mA/cm^2$, which has exhibited an increase in cell voltage of 1-2V due to build-up of scale, it typically completely reverses the increased cell voltage and reactivates the electrodes. This high current density reverse polarity cycle or "self-cleaning process" may be repeated periodically many times to provide scale removal and maintain a near optimal cell operating voltage and minimal power requirement for the generation of desired products. The process also eliminates the need for costly and time consuming cell disassembly, acid cleaning and other elaborate and costly maintenance procedures that are typical of other electrode materials and other operating modes.

It is likely that this system and method, including a periodic cleaning cycle, would allow the use of even more impure salt, and/or salt with higher concentrations of "scale forming impurities" (e.g. $Ca_{2+}$, $Mg^{2+}$). The voltage on the cell was observed to be lowered after 1-3 minutes of reverse polarity (i.e. approximately 10-20% reduction in cell voltage, e.g. from 6.6V to 5.6V with a 1 minute reverse polarization) and the amount of scale build-up from the use of solar salt was substantially eliminated by a reverse polarity cleaning cycle, as illustrated in FIGS. (3A-3D). Thus, it is clear that the use of an electrochemical cell with UNCD anodes and operation using a short reverse cycle, offers advantages for long term reliability and improved "maintenance free" operation of an electrochemical cell, when using low cost, impure salt and without requiring use of a water softener.

As described above, the system allows for a salt feedstock to be electrolyzed in the electrolytic cell to produce a desired product comprising chlorine or other forms of FAC and other oxidant species, including mixed oxidants from sodium chloride or other salts, including impure feedstock such as solar salt. Alternative salt feedstocks may comprise potassium chloride, or other alkali metal chlorides, for example.

Other preferred salt feedstocks are sodium or potassium sulfate, or any alkali or alkaline earth metal sulfate or sulfuric acid for on-site generation of peroxodisulfate ("persulfate"). Persulfate is a strong oxidant capable of oxidizing many refractory organic compounds.

Operational Lifetime of the Electrodes

The UNCD anodes are expected to have an operational life time of the electrodes at least 2 years and potentially greater than 5 years under current stresses of at least 300 $mA/cm^2$ Initial results under accelerated life testing of UNCD anodes on Ta substrates at 2500 $mA/cm^2$ of 1.0 M solar salt have shown lifetimes of at least two times better than the same UNCD anodes on Nb substrates tested in the same manner. Greater than 300 hours of failure-free operation at 2500 $mA/cm^2$, i.e. 750 $Ahr/cm^2$, was demonstrated without significant voltage change on the cell and without any significant change in the rate of chlorine production from the solar salt. This corresponds to greater than 5 years of operation without failure at 450 $mA/cm^2$ using previously demonstrated acceleration factors observed on DSA electrodes. Although the applicability of these acceleration factors have not been conclusively demonstrated yet on UNCD electrodes, it is clear that UNCD electrodes provide considerably longer life under these extreme current stress conditions than other commercially available electrodes, e.g. DSA electrodes, used for OSG of oxidants.

Thus, it is believed that the UNCD electrodes would demonstrate operational lifetime of at least 1 year, and likely 2 to 5 years or more, for operation at high current densities >300 mA/cm$^2$. It has been reported herein that operation at high current densities can provide current efficiencies at least 10% better than operation at the current densities typically used for conventional DSA electrodes. Thus the higher initial cost of the diamond electrodes is offset by their longer lifetime and improved reliability. Also, they offer the option to operate at higher current densities that cannot be achieved reliably with DSA electrodes, resulting in higher current efficiency, and hence improved cost efficiency for operation at high current density. The ability to perform a reverse polarity cleaning cycle significantly reduces problems with scale build-up and reactivates the electrodes, enabling more reliable long term operation.

Table 1 presents initial experimental data reported in the above referenced U.S. Provisional Application No. 61/475,978. This data demonstrates two notable features. The first is the increased performance, i.e. as evidenced by the rate of chlorine generation (FAC in ppm) per unit of electrode area, obtained by using UNCD electrodes at high current density (300 mA/cm$^2$ to 600 mA/cm$^2$ or greater) as compared to the more traditional DSA tion, or oxidation of the chlorine already produced to higher oxidation states, or reduction of previously synthesized chlorine at the cathode, will use up some of the electrons being passed through the cell and lower the relative current efficiency. A conventional DSA electrode is typically not able to operate over a long period of time (e.g. from 1-5 years) under high current density operation state to avoid a state of anode failure, so the current density is typically maintained at 150 mA/cm$^2$ or less. However, the UNCD electrodes can operate for extended periods at a current density of 600 mA/cm$^2$ or a current of 60 A applied to the cell for electrode of an active area of 100 cm$^2$.

Later experiments were subsequently carried out in another cell (Diamonox 200) wherein the electrodes are a matched pair of diamond electrodes having an active area of 200 cm$^2$. It was determined that in the initial experiments previously reported and shown in Table 1, due to an error in determining the concentration of FAC in ppm from analytical results, while the relative values of both the FAC in ppm and current efficiency shown in Table 1 are correct, the absolute values of FAC in ppm were overestimated by 20 to 25%. Thus data in Table 1 and FIG. 4 are now reported as relative values.

Figure 7:
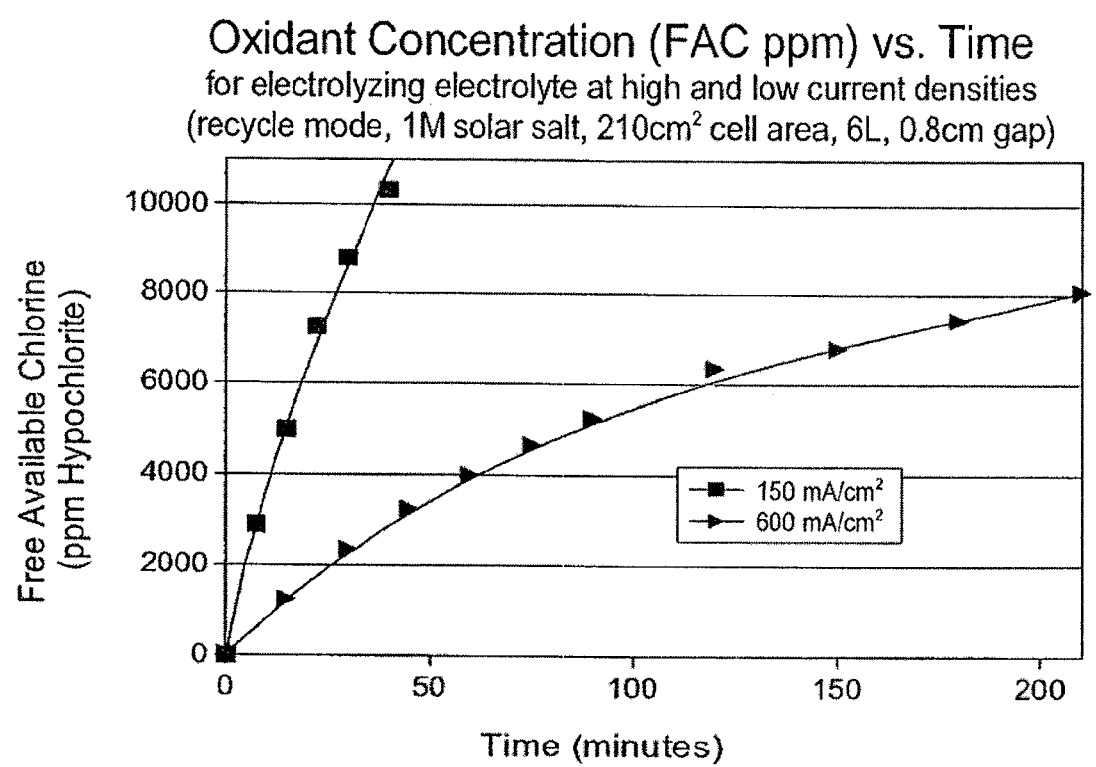

Quantitatively correct data comparing the rate of production of oxidant, i.e. the concentration of FAC in ppm as a function of time is shown in FIG. 7, which confirms that the

TABLE 1

| System | Gap mm | Salt | Temp ° C. | Current Density A/cm$^2$ | Anode | Cathode | Relative ECE 10K ppm Relative kWh r/lb. | Relative RATE for 100 cm$^2$ Relative output lb. FAC/day | Relative Current Efficiency. (±5%) |
|---|---|---|---|---|---|---|---|---|---|
| 1 Julius | 15 | 1M NaCl anal. | 17-20 | 0.15 | UNCD/Ta* | UNCD/Nb* | 4.61 | 0.79 | 75 |
| 2 Julius | 15 | 1M NaCl anal. | 30-50 | 0.15 | UNCD/Ta* | UNCD/Nb* | 3.64 | 0.76 | 72 |
| 3 Julius | 15 | 1M NaCl anal. | 31-51 | 0.30 | UNCD/Ta* | UNCD/Nb* | 4.49 | 1.74 | 83 |
| 4 Nero2 | 8 | 1M NaCl anal. | 34-38 | 0.60 | UNCD/Nb | Ti | 3.59 | 3.97 | 95 |
| 5 Nero2 | 8 | 1M NaCl anal. | 28-31 | 0.60 | UNCD/Nb | UNCD/Nb | 3.32 | 4.36 | 104 |
| 6 Nero1 | 8 | 1M NaCl anal. | 22-24 | 0.15 | DSA | SS | 1.83 | 0.81 | 77 |
| 7 Nero2 | 8 | 1M Solar Salt | 28-31 | 0.60 | UNCD/Nb | UNCD/Nb | 3.67 | 3.97 | 95 |
| 8 Nero2 | 8 | 1M NaCl anal. | 25-26 | 0.30 | UNCD/Nb | UNCD/Nb | 3.21 | 1.64 | 78 |
| 9 Nero1 | 8 | 1M NaCl anal. | 30-32 | 0.45 | UNCD/Nb | UNCD/Nb | 3.74 | 2.42 | 77 |
| 10 Nero2 | 8 | 1M NaCl anal. | 30-32 | 0.60 | UNCD/Ta* | UNCD/Ta* | 4.66 | 3.12 | 74 |
| 11 Nero2 | 4 | 1M NaCl anal. | 27-29 | 0.60 | UNCD/Nb | SS | 3.41 | 3.17 | 75 |
| 12 Nero2 | 4 | 2M NaCl anal. | 27-28 | 0.60 | UNCD/Nb | SS | 2.21 | 3.97 | 95 |

*Note: 50% duty cycle electrode polarity reversal electrodes operated at low current density (150 mA/cm$^2$). The second feature is an increase in current efficiency for UNCD anodes operated at higher current density. To the knowledge of the inventors, the latter effect has not been previously been reported by others.

Figure 6:
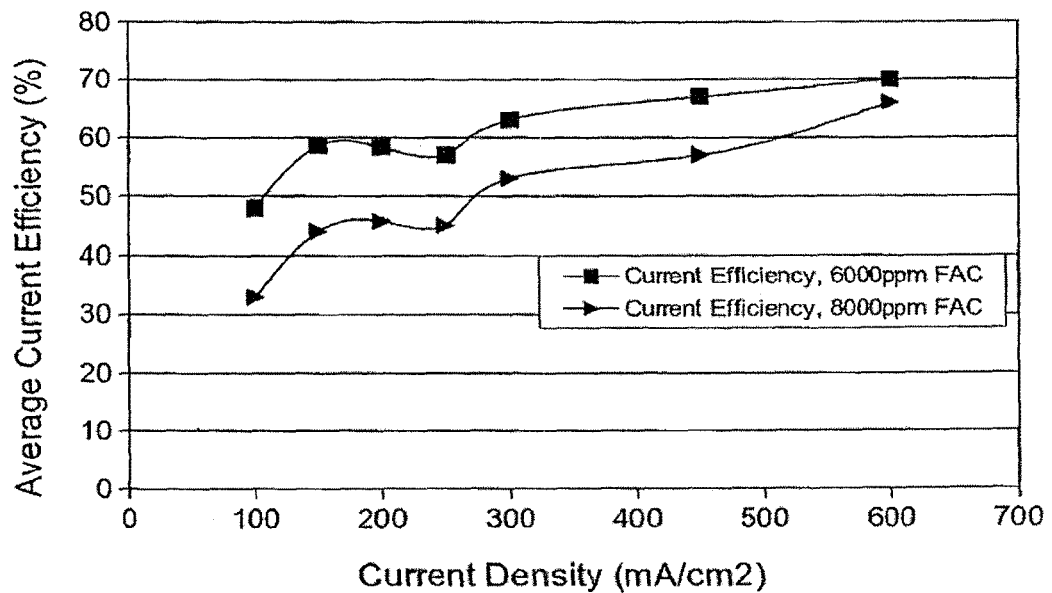
Figure 8:
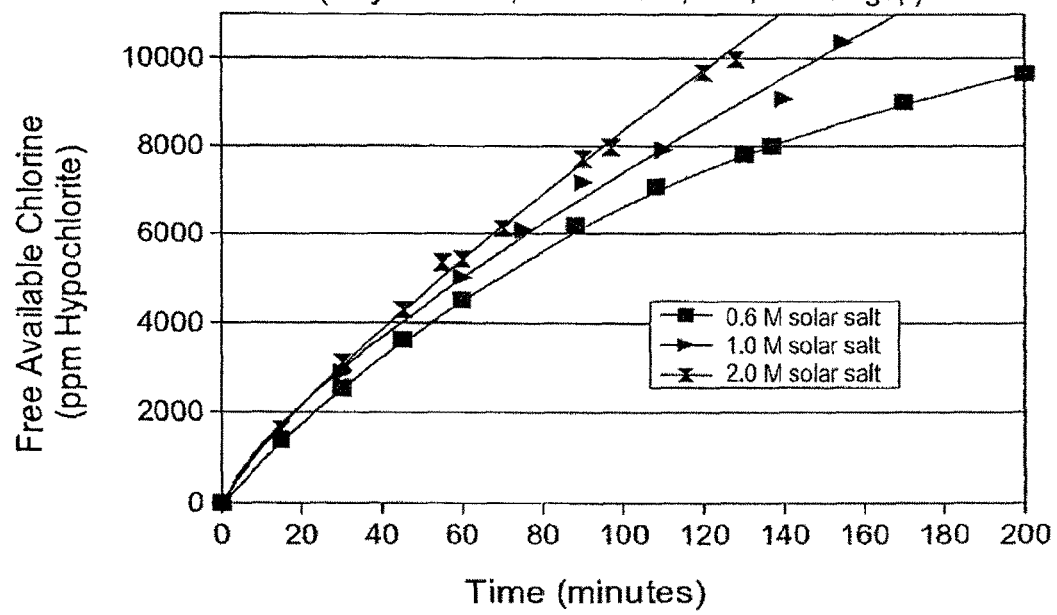

Current efficiency here, as is conventional in the art, refers to the amount of FAC generation as measured in pounds FAC per day as compared to the theoretical amount of FAC generation if 100% of the total amount of current applied to the cell were being used to produce chlorine. Typically, other electrochemical reactions on the anode, e.g. oxygen generarate of chlorine generation (FAC in ppm) per unit of electrode area, obtained by using UNCD electrodes at high current density (600 mA/cm$^2$ greater) is significantly increased relative to use of conventional DSA electrodes operated at low current density 150 mA/cm$^2$ These data also confirmed an increase in current efficiency when UNCD anodes operated at higher current density as represented, for example, in FIG. 6. FIG. 6 is a chart showing current efficiency as a function of current density for a 1M solar salt solution which has been electrolyzed to provide respectively 6000 ppm FAC and 8000 ppm FAC. FIG. 8 shows quantitative data for the FAC concentration in ppm vs. time for 3 different concentrations (i.e. 0.6M, 1M and 2M) of electrolyte feed stock comprising solar salt which were electrolyzed at 300 mA/cm$^2$, using a 12 L volume, in recycle mode. The FAC concentration reached 8000 ppm at 139 minutes and the current efficiency was 51% for electrolysis of the 0.6M solution. For the 1M solution, the processing time to reach 8000 ppm was 116 minutes and the current efficiency was 63%. For the 2.0 M solution the processing time to reach 8000 ppm was 96 minutes and the current efficiency was 72%.

Referring to the data in Table 1, for current densities in the range of 300-600 mA/cm$^2$ for the electrolysis of sodium chloride to FAC comprising hypochlorite, chlorine and mixed oxidants, it is demonstrated that the current efficiency can be raised by around 20% or more relative to operation at 150 mA/cm$^2$. Referring to FIG. 6, it can be seen that the current efficiency increases with current density. For example, at 8000 ppm FAC it can be seen that the current efficiency at 600 mA/cm$^2$ is raised by about 33%, i.e. doubled, relative to typical values obtained at ~100 mA/cm$^2$. As shown in FIG. 7, the solution electrolyzed at high current density (600 mA/cm$^2$) took 26 minutes to reach 8000 ppm FAC and the current efficiency was 66%. For electrolysis at low current density it took 208 minutes to reach 8000 ppm FAC and the current efficiency was 33%.

Other experimental results, at an optimal electrode gap, as explained below, and with operation at high current density, also showed significant increase in current efficiencies by about 20% for the generation of 10,000 ppm FAC (1% by weight FAC), for example.

This improvement in current efficiency results in greater production of product than would otherwise be expected from an increase in current density alone. This effect is more evident at higher salt conversion levels (i.e. when the reaction is allowed to proceed further towards complete conversion of chloride or other feedstocks (e.g. for generation of persulfate).

In particular, using recycle mode, and using UNCD electrodes at high current density, using a 1 Molar feedstock, the FAC concentration rose very rapidly to over 10,000 ppm and, as illustrated by FIG. 7, and the curve still appears to be steeply increasing at that point. By comparison, when using DSA anodes at 150 mA/cm$^2$, after several hours of operation, the FAC concentration plateaus well below 10,000 ppm.

Theoretically a 1M solution of pure sodium chloride would provide a maximum FAC concentration of 35.45 g/L, i.e. around 35,000 ppm FAC, at 100% conversion.

Without wanting to be constrained by any particular theory, it is possible that the higher current efficiencies particularly observed at greater salt conversion efficiencies are due to a higher relative rate of production of hydrogen gas bubbles which "masks" or "inhibits" the flow of anode product from the anode to the cathode and from reduction of the product produced on the anode. This reduction of the product at the cathode would otherwise reduce the overall efficiency of the reaction, especially at higher total conversion rates. In this context, a salt conversion efficiency of 10% for production of FAC from sodium chloride NaCl, for example, means 10 g of Cl per 100 g of NaCl.

Current density depends in part on the dynamics of the cell, the volume, and the flow rate of the electrolyte. In the above experiments, which were carried out at flow rates between 0.2 L/min to 9 L/min, per 100 cm$^2$ of active area, lower flow rates in the range from 1 to 5 L/min per 200 cm$^2$ of active area, were found to be beneficial relative to higher flow rates. However, very low flow rates were difficult to maintain reliably. Temperature is another important parameter. Thus it is desirable to control both the flow rate and temperature to obtain optimum current efficiency for high current density operation.

At high current densities, significant power is applied to a cell with a small active area, and results in a significant increase in temperature if cooling is not provided.

It was also observed that lower operating temperature increased current efficiency, although it may also increase the resistance in the cell. Additionally, it is known that impurities, e.g. calcium carbonate in hard water, are more soluble in cold water. So, when using impure salt feedstocks or hard water, it is preferable to operate at lower temperature to reduce precipitation of impurities to reduce scaling, as well as to improve current efficiency. For example, in applications for water treatment, there is usually a readily available supply of water at ambient temperature that may be used for water cooling of the apparatus.

Thus, to generate the data in Table 1, and subsequent experiments, cooling water was used to maintain relatively constant temperature for these experiments for the higher current density. However, at higher current densities (e.g. 600 mA/cm$^2$) increased voltages were required to maintain these higher current levels. This resulted in somewhat higher power requirements to produce a pound of FAC.

However, additional experiments were conducted (not shown in Table 1) during which the cooling water was turned off, and the cell operating temperature increased to 40-50 degrees Celsius, due to the high power being applied to the small cells. This resulted in a reduced operating voltage (much closer to the voltage for 150 mA/cm$^2$ operation). In addition, it can be seen in Table 1, that the last two lines of data were collected from a cell being operated with an anode to cathode separation (gap) of only 4 mm as compared to most of the rest of the experiments which were conducted with an electrode gap of 8 mm. The last line shows 600 mA/cm$^2$ data for a 4 mm gap with the use of 2M NaCl as the salt feedstock and operating with cooling water at approximately 27-28 deg. C. This particular set of conditions produced a very high current relative efficiency and a comparable cost per pound of FAC to that of using DSA electrodes at 150 mA/cm$^2$. Without cooling water, the temperature of this run would have been approximately 40-50 degrees Celsius, with lower current efficiency.

Beneficially the temperature is maintained below 30° C., and advantageously a temperature of 68 degrees Fahrenheit (~20° C.), or lower is desirable to reduce oxidation of the electrode. A temperature of 18-20° C. works well to produce higher current efficiency and low rates of scaling. Active cooling may be provided with a liquid to liquid heat exchanger for example. Since energy is required for cooling, although this is compensated by the increase in current efficiency, maintaining a temperature below 30° C. provides an advantage without excessive cooling cost.

The gap (electrode separation) specified in Table 1 for the experiments that were conducted to illustrate operation of the system at high current density according to embodiments of the invention were not chosen to optimize the output parameters of the system. Such parameters may comprise the power requirement for a pound of FAC produced and the amount of FAC generation per unit time for a given electrode size, other considerations such as the likelihood of catastrophic failure and ease of flow of electrolyte as a function of pump speed. However, 4 mm and 8 mm were selected as reasonable values for the gap from the literature on diamond electrodes. Further detailed experiments on the trade-offs between gap and other parameters would be required to explore the parameter space more fully. In these experiments it was demonstrated that an electrode gap in the range between 4 mm and 8 mm does allow for efficient operation. However, for purposes of inclusiveness, it is clear that an operating range of about 2 mm-15 mm would be possible.

The use of a matched set diamond anodes and cathodes, e.g. UNCD/Nb, or UNCD/Ta electrodes, together with periodic polarity reversal for as little as a few minutes per day of operation, substantially reduces the effects of scaling (see FIG. 3) and lengthens the lifetime of the anode. In theory, as suggested in the Asano reference cited above, a 50% duty cycle for a given polarity on a given electrode could theoretically lengthen the lifetime by as much as 100% (since the "anode" would only be exposed to positive potential, i.e. acting as the anode for approximately half of the time.). However, in practice, for operation of the current system with high currents and high current density, it is not easy to automatically and efficiently control polarity reversal on a 50% duty cycle. Thus, the discovery reported herein that a much short reverse polarity cleaning cycle, at high current density, can be effective in substantially eliminating scaling avoids the need for complex current switching and allows for continuous production of oxidant over extended periods of time with only short cleaning cycles. Typically, an operator periodically checks the system for regular maintenance. Depending on operating conditions, during regular maintenance, an operator may apply a short reverse polarity, high current density, cleaning cycle for a few minutes for each 24 hours or in some cases, a few minutes or less, only once a month. This process thus reduces or eliminates the need for costly and time-consuming acid cleaning, cell disassembly and other elaborate and costly maintenance procedures that are typical of other electrode materials and other operating modes.

For some reactions and desired products it may be advantageous to more fully convert the feedstock into product (i.e. obtain a higher percentage of conversion). This may be easier to accomplish on UNCD electrodes, due to the higher current densities possible on these electrodes without early failure and the higher rate of production of hydroxyl radicals on diamond electrodes in general compared to other electrode materials. Therefore in some embodiments of the invention it may be advantageous to take advantage of this characteristic of UNCD electrodes and increase the conversion rate of the desired product as high as 30% or even as high as 50%. This would not be possible for the example of chlorine mixed oxidant production, where it was observed that the FAC concentration did not rise above substantially 12000 ppm in recycle mode (which represents 20.6% conversion of the original mass of sodium chloride, IM, 5 8000 ppm).

Higher conversion rates might be applicable, for example, to the case of persulfate generation from sulfate salts. In that case, the high rate of hydroxyl radical production on UNCD electrodes combined with their extreme durability at high current density, would allow very high efficiency production of persulfate from sulfate salts up to very high conversion rates, especially at high current densities, e.g. 600 mA/cm$^2$ to 1000 mA/cm$^2$.

For some applications of OSG of oxidants using UNCD electrodes, it is desirable to perforate the electrode with many holes to increase the local electric field for the generation of a desired product. This may be advantageous for the example for the generation of ozone from aqueous solution on UNCD electrodes. Durable substrates such as Nb or Ta with highly conformal coatings of UNCD again provide an advantage for these applications since UNCD can be induced to cover the surface of the substrate even down into holes drilled in substrates.

Disinfection Tests

Figure 5:
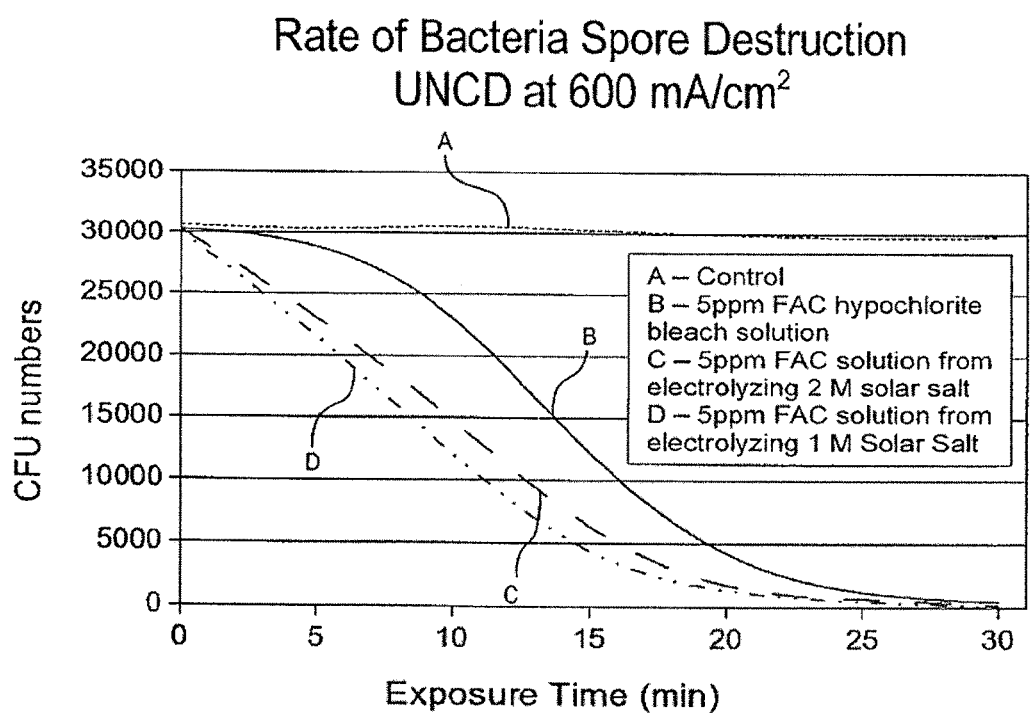
FIG. 5 shows a chart showing Colony Forming Units (CFU) numbers vs. exposure time to demonstrate inactivation of hard-to-kill *Bacillus globigii* spores by a solution comprising oxidant generated by electrolyzing sodium chloride at high current density in a diamond electrode OSG system according to a method of a preferred embodiment relative to standard bleach solution.

FIG. 5 shows the rate of disinfection of highly resistant bacterial spores of *Bacillus globigii* in the chlorine/mixed oxidant solutions produced on UNCD electrodes for various operating conditions. These disinfection tests were all conducted with oxidant solutions having a FAC concentration of 5 ppm (i.e. 5 mg/L) in order to clarify any other effects on the rate of disinfection. With no oxidant added (FIG. 5: A—Control), the spore levels are relatively constant as a function of time at an approximate level of surviving spores of 30,000 Colony Forming Units—CFUs. Using a standard solution of Chlorox® bleach having a FAC concentration of 5.0 mg/L, the CFU numbers of surviving spores of the contaminated solution dropped substantially over a period of thirty minutes (Curve B-Bleach). About 14 minutes of exposure to 5 ppm bleach was required to decrease the number of CFUs by 50%. Using a 5 ppm FAC (FAC concentration of 5.0 mg/L) mixed oxidant solution produced by electrolyzing a 1M Solar salt solution at a current density of 600 mA/cm$^2$ and 8 mm electrode spacing using UNCD/Nb electrodes, the spore count dropped significantly more rapidly (Curves C) than using the standard bleach solution (Curve B).

Adjusting the current density and the FAC concentration and the salt concentration affected the rate of spore destruction. A 5 ppm FAC oxidant solution produced from electrolyzing 1M Solar Salt solution a current density of 600 mA/cm$^2$ using a UNCD/Nb anode reduced the spore count more rapidly than the oxidant solution produced from a 2 M Solar Salt solution. It took only 8 minutes for 50% of the spores to be destroyed by the 5 ppm FAC oxidant produced from a 1M solution of solar salt. However, it took 10 minutes for destruction of 50% of the spores by a 5 ppm FAC oxidant solution produced from a 2M solution of solar salt at 600 mA/cm$^2$ on UNCD/Nb (Curve C of FIG. 5). By way of comparison, a 5 ppm FAC oxidant solution produced by electrolyzing a 1M solution of food grade salt on a DSA anode at 150 mA/cm$^2$ took 12 minutes to provide 50% destruction (data not shown in FIG. 5). These results demonstrate that oxidant solutions produced by electrolyzing salt feedstocks using UNCD electrodes operated at high current density (e.g. 600 mA/cm$^2$) according to methods described above reduce the amount of time required to disinfect a target organism by at least 30% and as much 40%.

Figure 9:
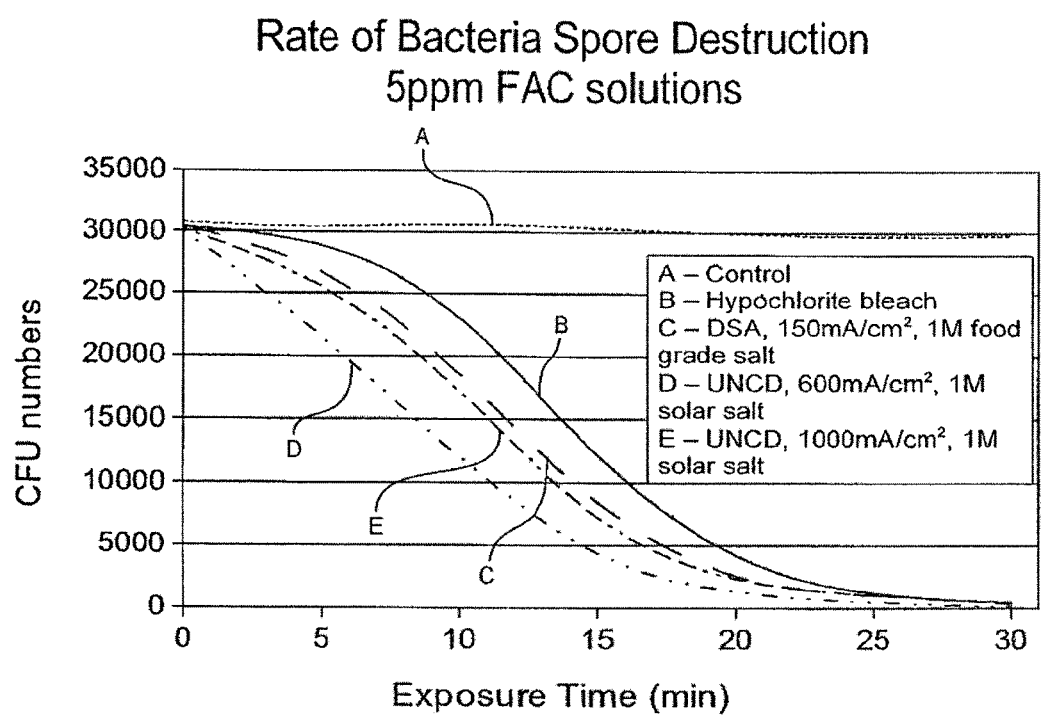

Additional data comparing the rate of destruction of *B. Globigii* by oxidant solutions prepared by diamond anode electrolysis of sodium chloride (solar salt) according to preferred embodiments of the invention compared to a solution prepared by DSA anode electrolysis at 150 mA/cm$^2$, using pure sodium chloride (i.e. food grade salt) relative to conventional bleach solution, are shown in FIG. 9. As noted above, the oxidant solution produced conventionally using a DSA anode (Curve C) at lower current density (150 mA/cm$^2$) had a disinfection rate significantly better than regular bleach (Curve B), i.e. about 12 minutes to reach 50% destruction. By comparison, a solution produced by electrolyzing 1M solar salt at 600 mA/cm$^2$ using diamond electrodes only took about 8 minutes to provide an equivalent effect i.e. 50% faster (Curve D). Interestingly a solution electrolyzed at 1000 mA/cm$^2$ using diamond electrodes provided an improvement relative to curve C, but not as significant as curve D. Thus it appears that a process using electrolysis at about 600 mA/cm$^2$ provides both excellent current efficiency and is also beneficial in providing an oxidant solution with a superior efficacy in destroying microorganisms such as these, as evidenced by the accelerated disinfection rates. Moreover, under these test conditions, it appears that current densities closer to 1000 mA/cm$^2$ while providing higher current efficiencies, generate an oxidant with a lower rate of disinfection. As operation at 1000 mA/cm$^2$ would lead to higher current stresses on the electrode, and thus a shorter lifetime, these results, together with the process results and parameters discussed above, suggest that operation at a high current density, substantially in the range of 300 to 600 mA/cm$^2$ provides advantages with respect to output capacity oxidant, current efficiency and for generation of an oxidant that is highly effective against known chlorine resistant microorganisms.

B. Globigii spores are difficult to destroy in chlorine-only disinfectants. The observed effect of a significant acceleration in the rate of destruction of this refractory biological species is believed to result from production of a mixed oxidant, i.e. comprising greater amounts of other oxidant species, such as hydrogen peroxide or hydroxyl radicals, or chlorine dioxide, in addition to hypochlorite. These results are believed to be indicative of the improvements that could be expected in treating other refractory biological species such as *Cryptosporidium parva, legionella*, and *Giardia*, all of which are very difficult to destroy with regular bleach or chlorine only (e.g. "hypochlorite") disinfectants.

Thus, advantageously it is demonstrated that a process using UNCD electrodes at high current density can generate an oxidant solution that produces significantly higher rates of destruction of refractory biological species destruction than either chlorine bleach alone or oxidant solutions generated form a similar electrolyte feedstock with the incumbent technology for OSG using DSA electrodes at lower current density.

Moreover, as mentioned above, the use of diamond electrodes with a brief reverse polarity cleaning cycle, also at high current density, manages scaling and enables use of lower purity and less expensive salt feedstocks such as solar salt.

Operation at higher current densities, in the range from 150 to 1000 mA/cm$^2$, and particularly above 200 mA/cm$^2$, in a preferred range from 300 to 600 mA/cm$^2$, permits the use of a smaller electrode/cell to produce a given rate of product formation than low current density operation. Accelerated testing indicates that a UNCD anode is expected to have an operational lifetime of greater than two years, and potentially 5 years, for operation >300 mA/cm$^2$. In this context, the end of the operational lifetime is defined as the point at which the operating voltage irreversibly increases by several volts. Typically, a UNCD electrode would begin to fail if there is >50% delamination, and at 70-90% delamination the voltage is observed to rise exponentially.

As described herein, it has been discovered that, in systems comprising at least a diamond anode, operation at high current density provides a higher rate of production of FAC, and additionally provides improved current efficiency and reduced energy requirements per unit of oxidant, resulting in improved cost efficiency, or cost per pound of oxidant. In preferred embodiments, operation at high current density also results in an oxidant that is believed to be a mixed oxidant because it provides increased disinfection capability per unit of oxidant relative to standard bleach or hypochlorite solutions of comparable FAC concentrations. Operation at high current density thus enables use of smaller, and therefore less expensive, cell sizes to obtain a required daily output of oxidant and reduced operating costs per pound of oxidant.

A common objection to use of higher current density is that higher operating voltages lead to higher power consumption. However, this effect is offset by use of higher salt concentration and the resulting higher current efficiency, which directly impacts all costs. In particular, operation at higher current density is demonstrated to provide multiple benefits, i.e. increased current efficiency, increased daily output of oxidant, and under some conditions, a FAC/mixed oxidant with improved efficacy for disinfection, i.e. higher disinfection rate with respect to microorganisms that are considered to be resistant to conventional hypochlorite (FAC) solutions.

The use of a "recycle mode" or batch mode to gradually increase the concentration of the desired end-product (oxidant) has been shown to offer advantages, such as more complete salt conversion at higher concentrations. This is beneficial because higher salt concentrations are preferred for higher current density.

INDUSTRIAL APPLICABILITY

Embodiments of the present invention provide systems and methods for electrochemical OSG of oxidants, such as hypochlorite or other FAC species, including mixed oxidants. These oxidants may be used for water treatment, for example, to reduce undesirable pathogens or microorganisms. Another application is oxidation treatment of industrial wastewater, e.g. to oxidize or otherwise break down undesirable organics.

The use of at least a diamond anode, and optionally a matched diamond anode and cathode, and operation at high current density provides for higher current efficiency operation, which potentially allows for use of a lower cost, more compact system to generate a required daily output of oxidant Beneficially diamond electrodes also allows for reverse polarity operation, for as little as a few minutes per day, or less, which reduces build-up of scale from impurities and prolongs electrode lifetime between maintenance. Advantageously, this mode of operation facilitates use of low cost, impure electrolyte feedstocks, such as solar salt, without the need for expensive filtration or water softeners to manage fouling.

Methods are provided for operation of the system in either a single pass mode, for example using sea water, or in a recycling or batch mode. Batch mode processing with recycling of electrolyte feedstock at high current density provides for rapid and efficient generation of high levels of oxidant, i.e. 10,000 ppm or more FAC.

Moreover, test results indicate that the resultant oxidant solutions appear to have improved efficacy with respect to the rate of disinfection of microorganisms that are chlorine resistant.

These systems and methods for OSG at high current density are also expected to be useful for production of oxidants comprising persulfate.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A system for On-Site Generation (OSG) of an oxidant solution for chemical water treatment and disinfection comprising: an electrochemical cell comprising:
   an anode comprising ultra-nano-crystalline diamond on a substrate and a cathode defining an active area of the cell;
   an input port and flow control means for injecting an aqueous electrolyte feedstock between the electrodes, said electrolyte feedstock consisting essentially of a salt solution having a concentration in the range greater than 0.1 Molar to 3 Molar, said salt being selected for electrochemical generation of an oxidant comprising one or more of hypochlorite, other free and available chlorine (FAC), hydrogen peroxide, chlorine dioxide, ozone, and mixed oxidants;
   current means for supplying current for electrolyzing the aqueous feedstock electrolyte at a current density in the range from 150 mA/cm$^2$ to 3000 mA/cm$^2$ to produce an oxidant solution containing said oxidants; and
   an output port for supplying the oxidant solution from the electrochemical cell.

2. A system according to claim 1 operable for electrolyzing the aqueous feedstock electrolyte at a current density 200 mA/cm$^2$.

3. A system according to claim 1 operable for electrolyzing the aqueous feedstock electrolyte at a current density in the range from 300 to 600 mA/cm$^2$.

4. A system according to claim 3 further comprising control means for controlling the electrolyte temperature and flow rate and wherein, dependent on electrolyte feedstock concentration, during an operational cycle the current density is selected to provide a current efficiency at least 60% greater than the current efficiency at 150 mA/cm$^2$ at the selected temperature and flow rate.

5. A system according to claim 1 wherein the ultra-nano-crystalline diamond anode comprises one of tungsten, graphite, stainless steel, zirconium, niobium, tantalum, or titanium.

6. A system according to claim 1 wherein the cathode comprises one of ultra-nano-crystalline diamond, conductive diamond, tungsten, graphite, stainless steel, zirconium or titanium.

7. A system according to claim 1 wherein the anode and cathode are a matched pair of conductive diamond electrodes comprising UNCD on a metal substrate.

8. A system according to claim 1 wherein at least the diamond anode is rated for an operational lifetime at a current density of >500 mA/cm$^2$ of greater than 1 year.

9. A system according to claim 1 wherein operation at >900 mA/cm$^2$ provides a current efficiency that is at least 60% higher than the current efficiency for operation of systems based on dimensional scalable anode at 150 mA/cm$^2$, with other substantially similar operating parameters.

10. A system according to claim 1 wherein operation at >500 mA/cm$^2$ provides a current efficiency greater than 50%, with a salt conversion efficiency of greater than 10%.

11. A system according to claim 1 having an output capacity of more than 1 pound (0.45 kg) per day of free and available chlorine for each 100 cm$^2$ of active area ultra-nano-crystalline diamond anode.

12. A system according to claim 1 which is further operable in reverse polarity for a cleaning cycle.

13. A system according to claim 1 further comprising temperature control means for maintaining the electrolyte at a temperature in a selected range.

14. A system according to claim 1 further comprising control means for selecting operating parameters comprising a current density in the range from 300 to 600 mA/cm$^2$, a flow rate in a range from 0.2 to 10 L/min per 200 cm$^2$ of active area, and an operating temperature below 30° C.

15. A system according to claim 1 configured for operation in a recycle mode or a batch mode, wherein the system further comprises a feedstock electrolyte reservoir coupled between the output port and the input port for recirculation or recycling of a volume/batch of the electrolyte during electrolysis to increase the oxidant concentration and/or percentage conversion of the salt.

16. A system according to claim 1 configured for operation in a single pass mode, such that the pumping means injects aqueous electrolyte from the input port, at a selected/desired flow rate between the electrodes, to the output port of the cell.

17. A system according to claim 1 further comprising means for applying a high current density reverse polarity cleaning cycle for 15 seconds to several minutes after operation at forward polarity for an extended operational period.

18. A system according to claim 1 wherein the controller provides for periodic reverse polarity cleaning cycle of less than 5 minutes per 24 hour operational period.

19. A system according to claim 1 wherein the pump means provides for injection of feedstock electrolyte at a rate from 0.2 L to 10 L per minute for each 100 cm$^2$ of active area.

20. A system according to claim 1 wherein the pump means provides for injection of feedstock electrolyte at a plurality of different rates for controlling the rate of reaction or production of oxidant or other reactive species in the cell.

21. A system according to claim 1, wherein the salt of the salt solution is one of sodium chloride (salt), solar salt, or other salt comprising more than 0.1% by weight of impurities.

22. A system according to claim 1 wherein the electrodes are spaced by an inter electrode separation in the range from 3 mm to 15 mm.

23. A system according to claim 1 wherein one or both electrodes comprise a plurality of holes or perforations to enable flow through operation.

* * * * *